United States Patent
Nam et al.

(10) Patent No.: US 7,494,520 B2
(45) Date of Patent: Feb. 24, 2009

(54) FILTER DEVICE FOR VACUUM CLEANER

(75) Inventors: Hyeun-Sik Nam, Seoul (KR); Yong-Woo Lee, Seoul (KR); Choon-Myun Chung, Gyeonggi-Do (KR); Ho-Seon Rew, Seoul (KR)

(73) Assignee: LG Electronics Inc., Seoul (KR)

( * ) Notice: Subject to any disclaimer, the term of this patent is extended or adjusted under 35 U.S.C. 154(b) by 915 days.

(21) Appl. No.: 10/912,038

(22) Filed: Aug. 6, 2004

(65) Prior Publication Data

US 2005/0198766 A1   Sep. 15, 2005

(30) Foreign Application Priority Data

Mar. 9, 2004   (KR) ............... 10-2004-0015925

(51) Int. Cl.
*A47L 9/16* (2006.01)

(52) U.S. Cl. .................. 55/289; 55/282; 55/283; 55/DIG. 2; 55/DIG. 3; 55/298; 55/295; 15/347; 15/352; 15/353; 210/413

(58) Field of Classification Search .............. 55/282, 55/283, 289, DIG. 2, DIG. 3, 295, 298; 15/347; 15/352, 353; 210/413
See application file for complete search history.

(56) References Cited

U.S. PATENT DOCUMENTS

| | | | | |
|---|---|---|---|---|
| 3,145,164 A | * | 8/1964 | Johkman | .................. 209/254 |
| 3,246,754 A | * | 4/1966 | Sackett | .................. 209/316 |
| 3,778,864 A | | 12/1973 | Scherer | |
| 4,214,878 A | * | 7/1980 | Weiss | .................. 95/276 |
| 4,246,011 A | | 1/1981 | Oberdorfer | |
| 4,983,290 A | * | 1/1991 | Schumann | .................. 210/413 |
| 6,625,845 B2 | | 9/2003 | Matsumoto et al. | |
| 2001/0025395 A1 | | 10/2001 | Matsumoto et al. | |
| 2003/0159235 A1 | | 8/2003 | Oh | |

FOREIGN PATENT DOCUMENTS

| | | | | |
|---|---|---|---|---|
| CN | 1319372 | | 10/2001 | |
| DE | 1004780 | | 7/1954 | |
| EP | 1136028 | | 9/2001 | |
| EP | 1136028 A2 | * | 9/2001 | .................. 55/289 |
| FR | 2836056 | | 8/2003 | |
| GB | 2293993 | | 4/1996 | |

OTHER PUBLICATIONS

English language Abstract of CN 1319372.

* cited by examiner

*Primary Examiner*—Duane S Smith
*Assistant Examiner*—Minh-Chau T Pham
(74) *Attorney, Agent, or Firm*—Greenblum & Bernstein, P.L.C.

(57) ABSTRACT

A filter device for a vacuum cleaner includes a casing having a collecting space therein, a suction opening through which air including dust is sucked, formed eccentrically at one side so that sucked air can be rotated and a discharge opening through which purified air is discharged. A filter is installed at an internal space of the casing, for filtering dust from air sucked through the suction opening. A filter cleaning unit is disposed at an outer circumferential surface of the filter, for cleaning the filter by being rotated by a rotation force of air sucked through the suction opening. A rotation restrainer is provided for restraining rotation of the filter cleaning unit when the filter cleaning unit reaches a topmost position. Accordingly, fine dust attached to the filter in cleaning is removed so that a channel of the filter can be prevented from being closed.

10 Claims, 11 Drawing Sheets

FILTER DEVICE FOR VACUUM CLEANER

BACKGROUND OF THE INVENTION

1. Field of the Invention

The present invention relates to a vacuum cleaner, and more particularly, to a filter device of a vacuum cleaner capable of self-removing dust attached to a filter in operation of a cleaner.

2. Description of the Background Art

In general, a vacuum cleaner is an electronic device for cleaning an indoor space such as a room, an office or the inside of a car and can remove undesired impurities such as dust existing at home or the inside of a car by using a suction force thereof.

FIG. 1 is a perspective view showing a structure of a general vacuum cleaner.

As shown therein, a general vacuum cleaner includes a cleaner main body 1 and a suction head 3 connected to the cleaner main body 1 by a suction hose 5 and an expansion pipe 4, for sucking dust and foreign substances from a floor.

The cleaner main body 1 includes a suction force generating part (not shown) for generating a suction force; and a filter device 6 for collecting dust and foreign substances by a suction force generated from the suction force generating part.

As shown in FIG. 2, the filter device is provided with a knob 8 and detachably attached to the inside of the cleaner main body 1. Thusly, a user can couple the filter device to the cleaner main body 1 or separate it therefrom by using the knob 8, more conveniently.

FIG. 3 is a disassembled perspective view showing a filter device of a conventional vacuum cleaner, and FIG. 4 is a longitudinal sectional view showing a filter device of a conventional vacuum cleaner.

The filter device 6 in accordance with the conventional art includes a casing 11 having a collecting space therein, a suction opening 14 through which air including dust is sucked and a discharge opening 15 through which purified air is discharged; and a filter 13 installed at the internal space of the casing 11, for filtering dust from air sucked through the suction opening 14.

The casing 11 is formed in a cylindrical shape an upper side of which is opened and includes a cover 12 installed for covering an upper surface of the casing 11; a filter supporter 18 positioned at the cover 12 and having a discharge opening 15 formed penetratingly, though which air purified by the filter 13 is discharged outside; a support wall body 16 protruded from an inner lower portion of the casing 11 at a predetermined height; and a pair of blocking plates 17 installed at an upper surface of the support wall body 17 to face each other so that relatively big dust or foreign substances of dust introduced into the casing 11 are prevented from escaping therefrom.

A process for collecting dust in the filter device of the conventional vacuum cleaner will now be described.

When power is applied, a suction force is generated from a suction force generating part (not shown), and dust and foreign substances sucked through the suction head 3 are sucked into the casing 11 through the suction opening 14 via the expansion pipe 4 and the suction hose 5. The dust sucked into the casing 11 is purified by the filter 1 and collected in the casing 11, and only the air purified while passing through the filter 13 is discharged through the discharge opening. Here, relatively heavy dust or foreign substances fall to a gap between the blocking plates 17 by their weights and are collected at the inner lower portion. The support wall body 16 prevents an eddy which may occur in the space under the blocking plate 17 to thereby prevent dust from floating again and being moved to a space above the blocking plate 17. Fine dust or foreign substances which are relatively light in weight are not collected in a space under the blocking plate 17 but float with air and are purified by the filter 13 again.

However, such a conventional vacuum cleaner has a problem in that the filter 13 has to be cleaned or replaced periodically. This is because when the vacuum cleaner is used for a certain period of time, fine dust is attached to the filter 13 of the filter device 6, thereby deteriorating a suction force. That is, since fine dust closes up a close mesh of the filter 13, it is difficult to discharge sucked air and finally a decrease in suction force is caused. Accordingly, if the filter 13 is not periodically cleaned or replaced, a cleaning operation is not performed actively due to the deterioration of the suction force.

SUMMARY OF THE INVENTION

Therefore, an object of the present invention is to provide a filter device for a vacuum cleaner capable of preventing a channel of a filter from being closed, by removing fine dust attached to a filter in cleaning.

To achieve these and other advantages and in accordance with the purpose of the present invention, as embodied and broadly described herein, there is provided a filter device for a vacuum cleaner including a casing having a collecting space therein, a suction opening through which air including dust is sucked and a discharge opening through which purified air is discharged; a filter installed at an internal space of the casing, for filtering dust from air sucked through the suction opening; a filter cleaning unit disposed at an outer circumferential surface of the filter, for cleaning the filter while being rotated by movement of air sucked through the suction opening: and a rotation restraining means for restraining rotation of the filter cleaning unit when the filter cleaning unit reaches a top dead point.

Preferably, the casing of the filter device includes a suction opening formed eccentrically at its one side so that sucked dust and air can be rotated in the casing.

Preferably, the filter cleaning unit includes a rotary ring disposed at an outer circumferential surface of the filter; a blade mounted at an outer surface of the rotary ring, for rotating and lifting the rotary ring by movement of the air sucked through the suction opening; and at least one brush mounted inside the rotary ring, for removing dust attached to the surface of the filter by being rotated together with the rotary ring.

Preferably, the blade of the filter device is inclined on the basis of an axial direction of the filter so as to generate a rotation force and an ascending force.

Preferably, the rotary ring is made of a lightweight material so as to be rotated and lifted easily.

Preferably, the rotation restraining means includes a first stopper protruded from an upper surface of the rotary ring; and a second stopper formed to a filter supporter connected to the filter, by which the first stopper is caught.

Preferably, the first stopper is protruded in a direction that the rotary ring is rotated, the second stopper is protruded from a lower side of the filter supporter and includes an insertion groove in which the first stopper is inserted and an elastic member inserted in the insertion groove, for releasing the first stopper from the insertion groove when the cleaner is stopped.

Preferably, the first stopper includes a permanent magnet, and the second stopper is protruded from a lower side of the filter supporter and includes an insertion groove in which the first stopper is inserted and a permanent magnet inserted in the insertion groove, wherein a portion of the permanent magnet of the first stopper and a portion of the permanent magnet of the second stopper, which face each other, have the same polarity so that when the cleaner is in operation, the first stopper and the second stopper meet each other by movement of a fluid, and if the cleaner is stopped, the first stopper is separated from the second stopper by a magnetic force Preferably, the filter cleaning unit includes a rotary ring disposed at an outer circumferential surface of the filter; a brush supporter connected to the rotary ring and formed in an axial direction of the filter almost as high as a height of the filter; a blade formed at an outer surface of the brush supporter, for rotating the rotary ring by movement of air sucked through the suction opening; and a brush mounted inside the brush supporter, for removing dust attached to the surface of the filter by being rotated together with the rotary ring.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments of a filter device for a vacuum cleaner in accordance with the present invention, and hereinafter, the most preferred embodiments will be described.

Figure 1:
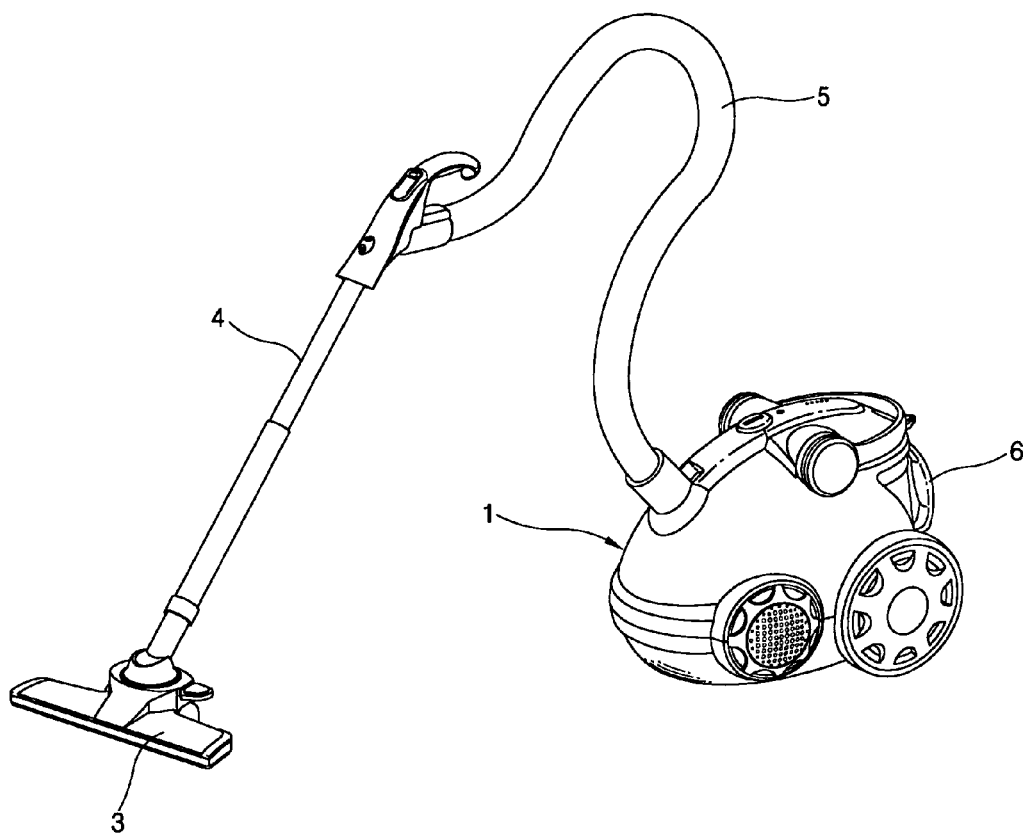
FIG. 1 a perspective view showing a structure of a conventional vacuum cleaner.
Figure 2:
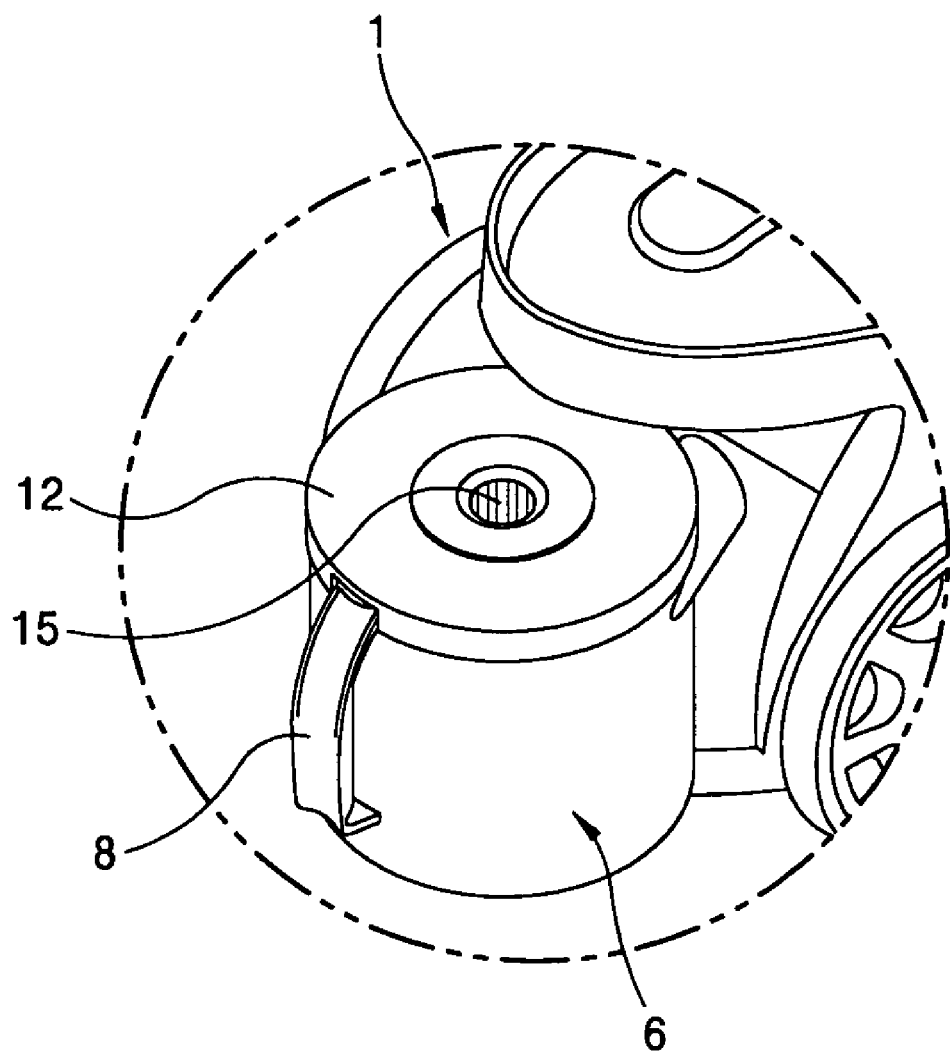
FIG. 2 is a perspective view showing a filter device of a conventional vacuum cleaner.
Figure 3:
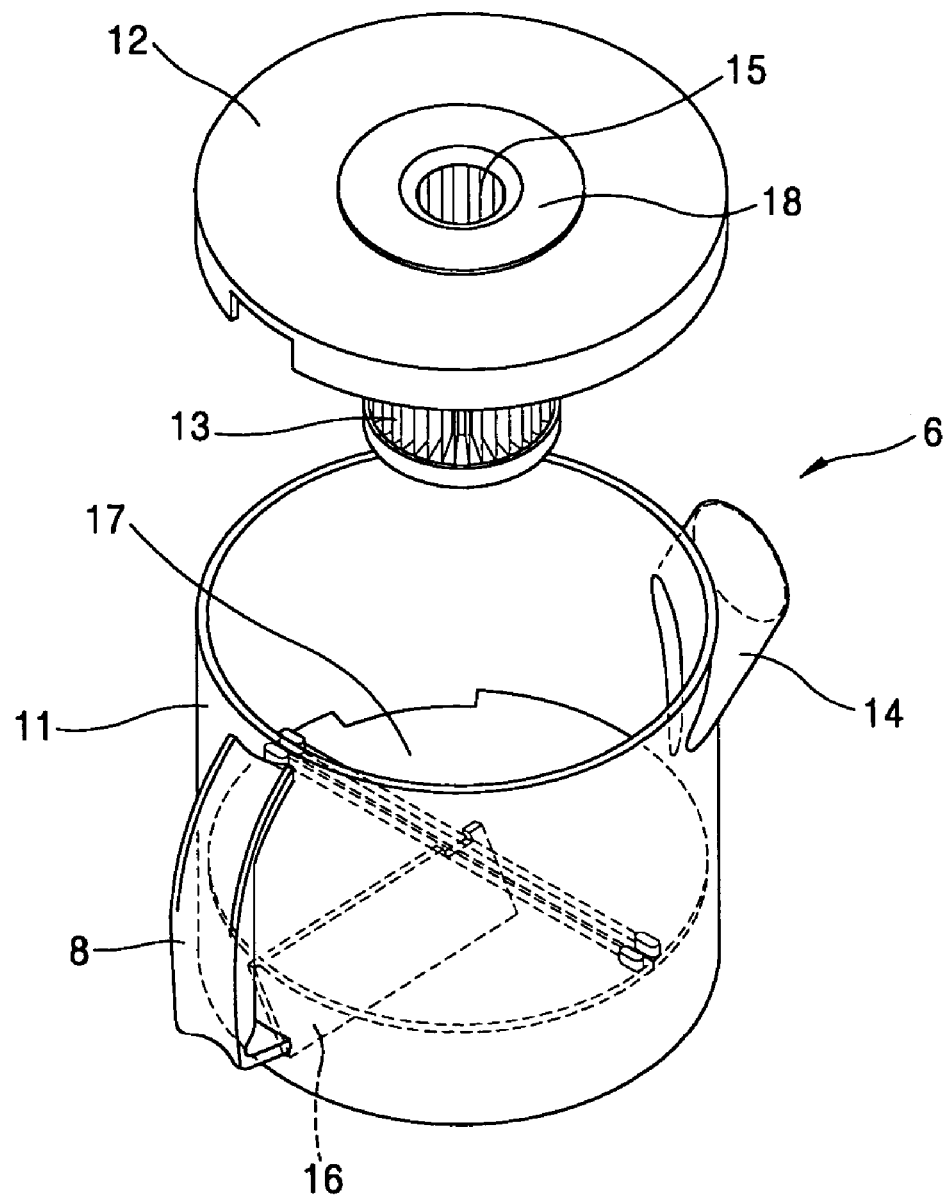
FIG. 3 is a disassembled perspective view showing a filter device of a conventional vacuum cleaner.
Figure 4:
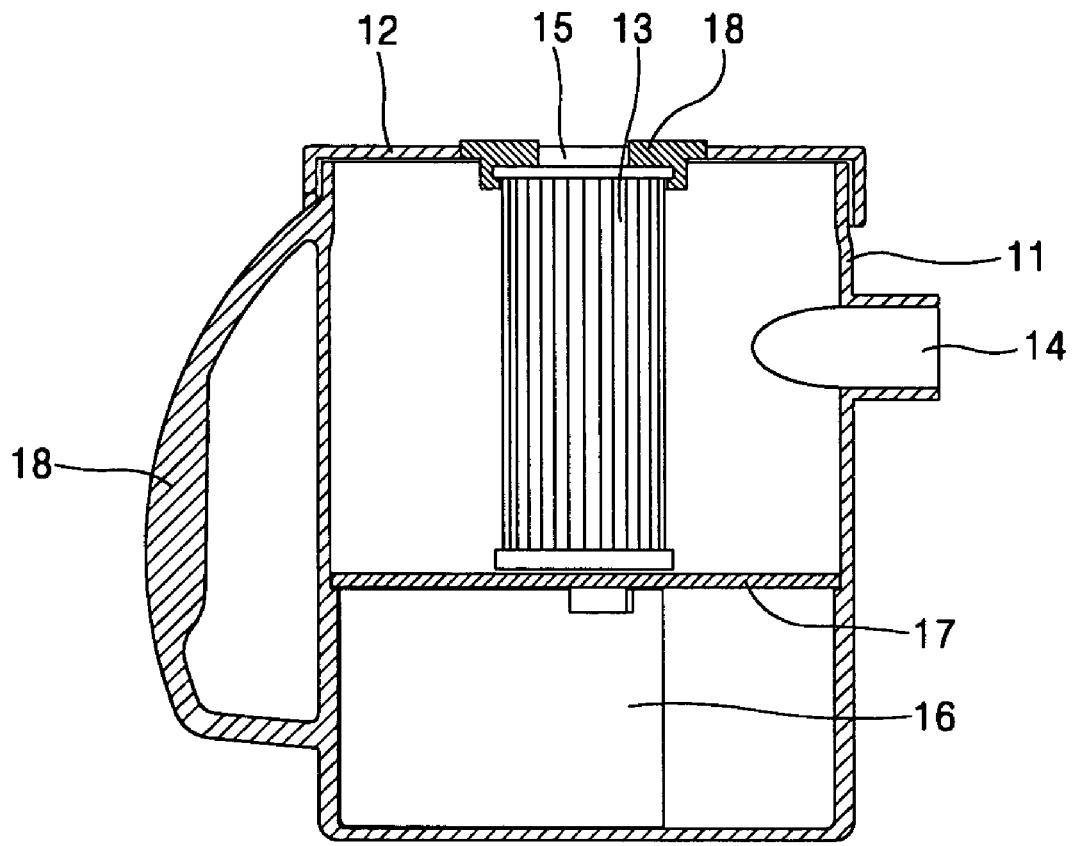
FIG. 4 is a longitudinal sectional view showing a filter device of a conventional vacuum cleaner.
Figure 5:
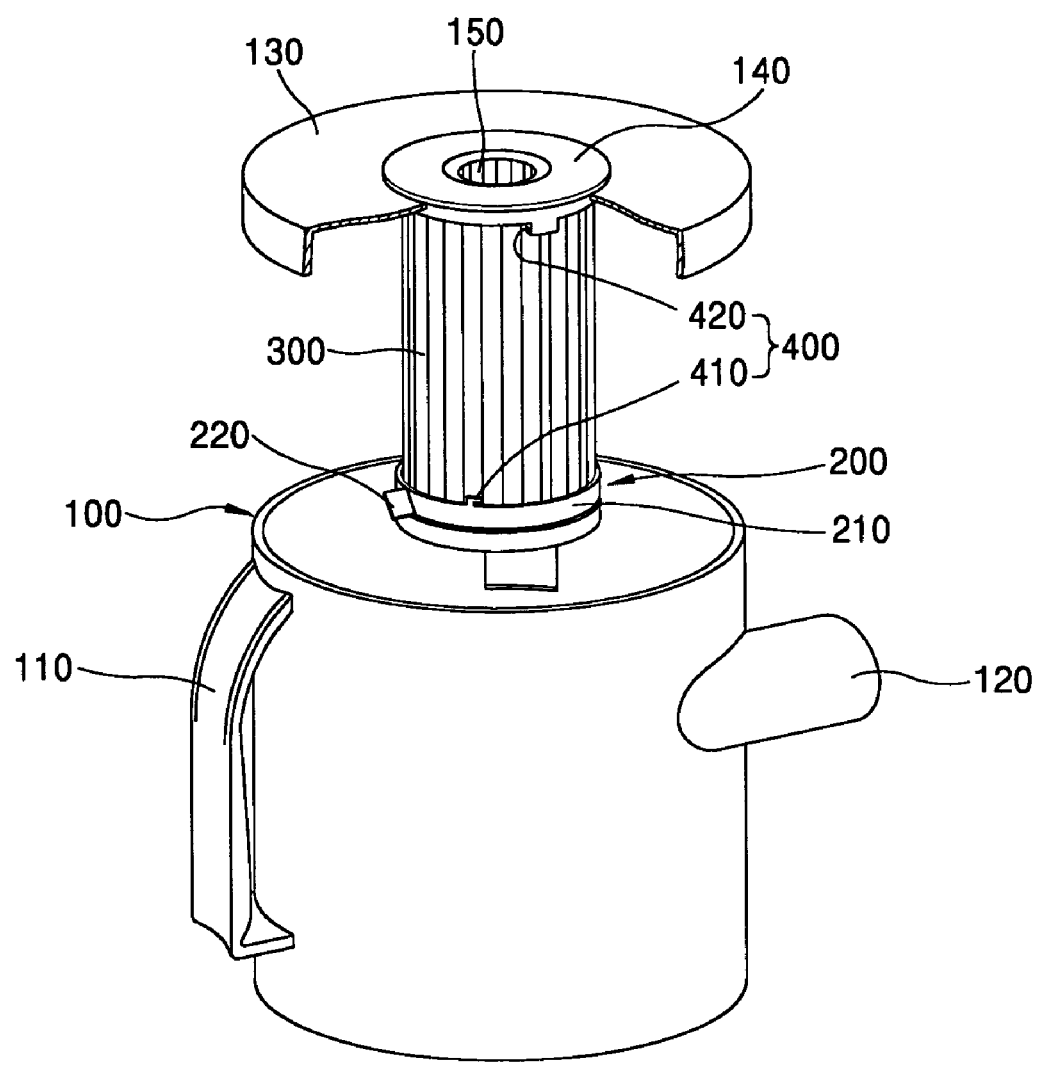
FIG. 5 is a partially cut-out perspective view of a filter device of a vacuum cleaner in accordance with a first embodiment of the present invention.
Figure 6:
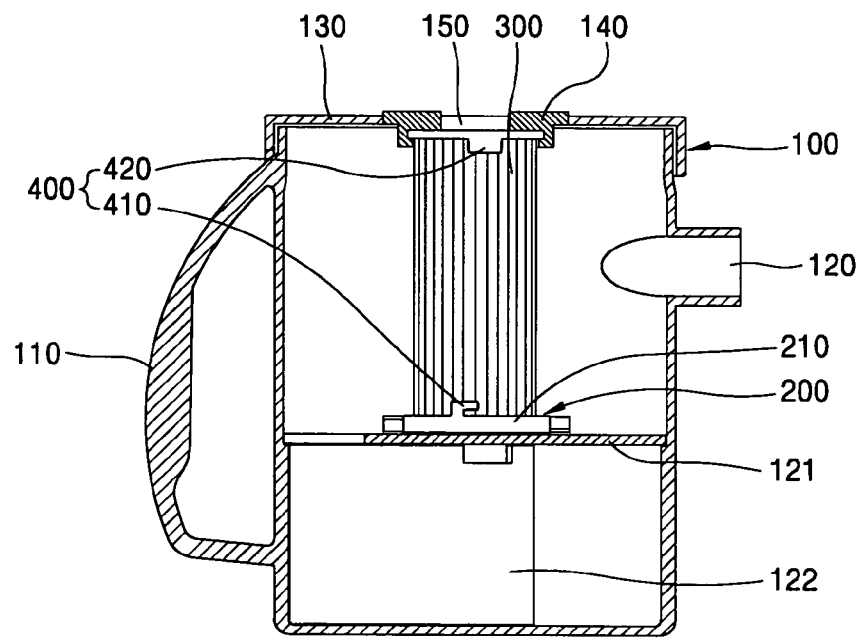
FIG. 6 is a longitudinal sectional view showing a filter device of a vacuum cleaner in accordance with a first embodiment of the present invention.
Figure 7:
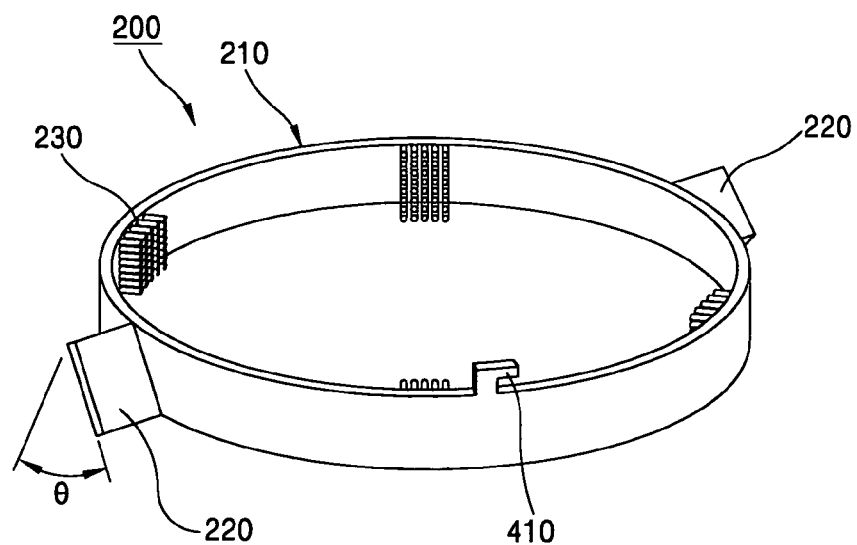
FIG. 7 is a perspective view showing a rotary ring in accordance with a first embodiment of the present invention.

FIG. 5 is a partially cut-out perspective view of a filter device for a vacuum cleaner in accordance with a first embodiment of the present invention, FIG. 6 is a longitudinal sectional view of a filter device for a vacuum cleaner in accordance with a first embodiment of the present invention, and FIG. 7 is a perspective view showing a rotary ring in accordance with the first embodiment of the present invention.

As shown therein, a filter device for a vacuum cleaner in accordance with the present invention includes: a casing 100 having a collecting space therein, a suction opening 120 through which air including dust is sucked and a discharge opening 150 through which purified air is discharged; a filter 300 installed at the internal space of the casing 100, for filtering dust from air sucked through the suction opening 120; a filter cleaning unit 200 disposed at an outer circumferential surface of the filter 300, for cleaning the filter 300 by being rotated by movement of air sucked through the suction opening; and a rotation restraining means for restraining rotation of the filter cleaning unit 200 when the filter cleaning unit 200 reaches a top dead point.

The casing 100 is formed in a cylindrical shape an upper side of which is opened and includes a cover 130 installed for covering the upper surface of the casing 100; a filter supporter 140 positioned at the cover 130 and having a discharge opening 150 formed penetratingly, through which air purified by the filter 300 is discharged outside; a support wall body 122 protruded from an inner lower portion of the casing 100 at a predetermined height; and a pair of blocking plates 121 installed at an upper surface of the support wall body 122 to face each other so that relatively heavy dust or foreign substances of dust introduced into the casing 100 are prevented from escaping therefrom.

Preferably, the suction opening 120 of the casing 100 is formed eccentrically at one side of the casing 100 so that introduced air and dust can be rotated in the casing 100.

The filter 300 is formed in a cylindrical shape and is fixedly installed at a lower surface of the filter supporter 140, receiving the discharge opening 150 at its upper surface.

The filter cleaning unit 200 includes: a rotary ring 210 disposed at an outer circumferential surface of the filter 300; a blade 220 mounted at an outer surface of the rotary ring 210, for rotating and lifting the rotary ring 210 by movement of air sucked through the suction opening 120; and at least one brush 230 mounted inside the rotary ring 210, for removing dust attached to a surface of the filter 300 by being rotated together with the rotary ring 210.

Preferably, the rotary ring 210 is made of a lightweight material so as to make rotation and lifting easy.

Preferably, the blade is inclined on the basis of an axial direction of the filter 300 so as to generate a rotation force and an ascending force.

The brushes 230 are protruded from the inside of the rotary ring toward its center at regular intervals (in the drawing, regular intervals of 90°) therebetween.

Figure 8:
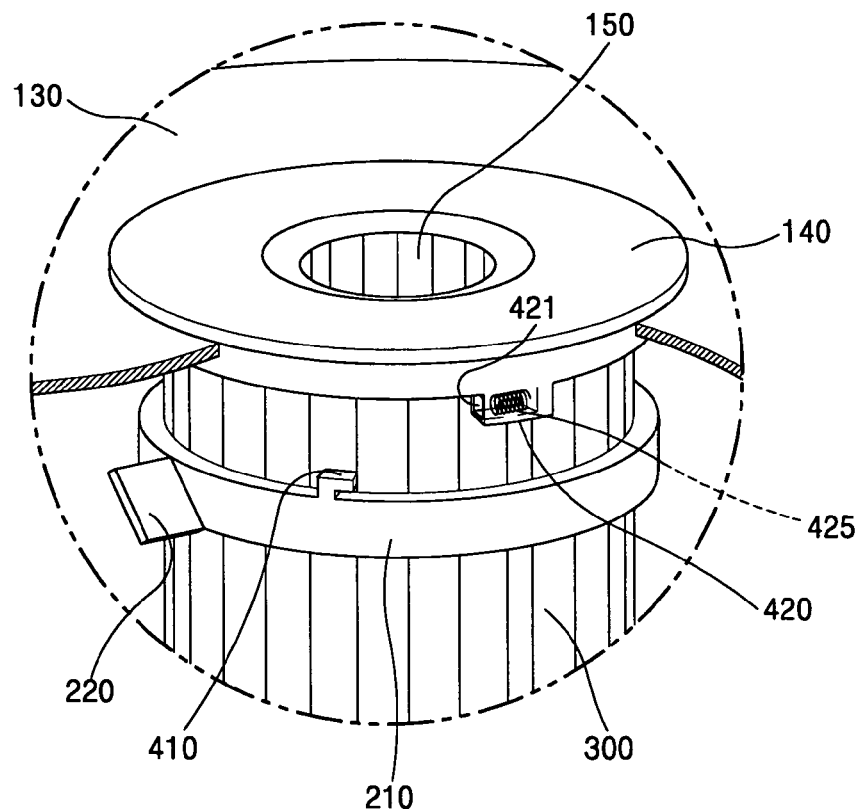
FIG. 8 is a perspective view showing a rotation restraining means of a vacuum cleaner in accordance with a first embodiment of the present invention.

As shown in FIG. 8, the rotation restraining means 400 includes a first stopper 410 protruded from an upper surface of the rotary ring 210; and a second stopper 420 formed at the filter supporter 140 connected to the filter 300, by which the first stopper 410 is caught.

The first stopper 410 is protruded in a direction that the rotary ring 210 is rotated.

The second stopper 420 is protruded from a lower side of the filter supporter 140 and has an insertion groove 421 in which the stopper 410 is inserted. An elastic member 425 for releasing the first stopper 410 from the insertion groove 421 when a cleaner stops operating is provided in the insertion groove 421.

Preferably, the elastic member is a coil spring.

An operation of a filter device for a vacuum cleaner in accordance with the present invention as above will now be described.

FIG. 9 is an operational view showing a process that a vacuum cleaner in accordance with the first embodiment of the present invention cleans a filter.

When power is applied and a suction force generating part (not shown) is operated, dust or filth sucked to the suction head of the vacuum cleaner is sucked into the casing 100 through the suction opening 120, together with air. While foreign substances such as dust sucked together with air are rotated along a wall surface of the casing 100, relatively heavy foreign substances among them fall by their weights and are collected at the inner lower portion or the casing 100. Like the conventional art, in the present invention, the support wall body 122 prevents an eddy from occurring in a space under the blocking plate 121 to thereby prevent dust from floating again and being moved to a space above the blocking plate 121, and fine dust or foreign substances in air sucked through the suction opening 120 are purified again by the filter 300.

Figure 9A:
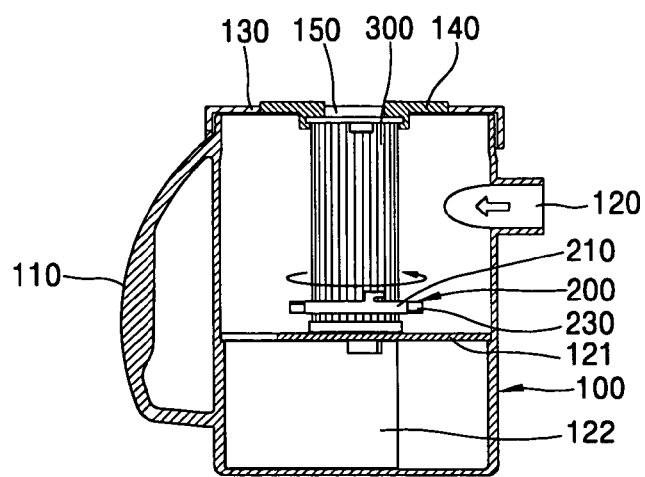
FIGS. 9A-9C are operational views showing a process that a vacuum cleaner in accordance with a first embodiment of the present invention cleans a filter.
Figure 9B:
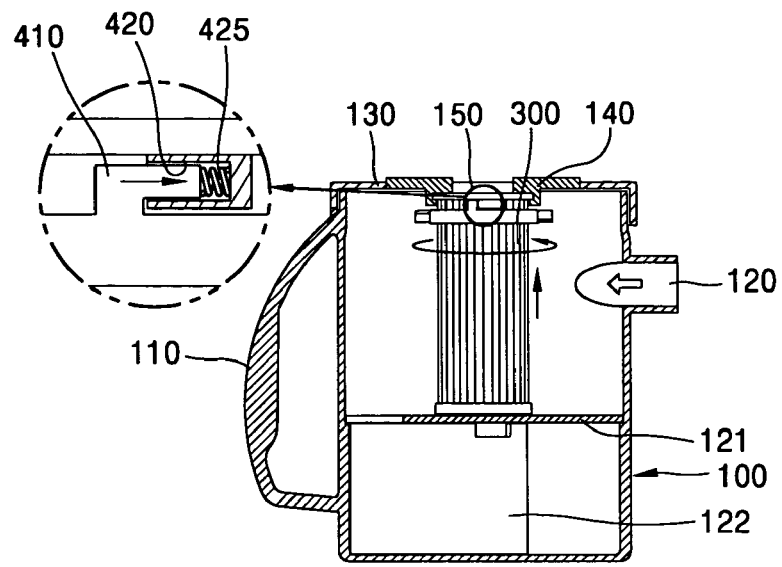

Here, as shown in FIG. 9A, air rotating along an inner wall surface after being sucked into the casing 100 collides against the blade 220 of the filter cleaning unit 200 located at the outer circumferential surface of the filter 300, thereby rotating and lifting the rotary ring 210 of the filter cleaning unit 200. Thereupon, the brush 230 brushes the outer circumferential surface of the filter 300 in a direction that the air rotates to thereby remove fine dust or filth from the filter 300. Thereafter, as shown in FIG. 9B, when the filter cleaning unit 200 ascends to an upper end of the filter 300, the first stopper 410 provided at the upper end of the filter cleaning unit 200 is inserted in the second stopper 420 provided at the upper end of the filter 300 to restrain further rotation thereof so as to prevent the brush 230 of the filter cleaning unit 200 from cleaning the filter 300, excessively. Here, the elastic member 425, a compression spring, is mounted in the second stopper 420 and maintains its state of being compressed by air pressure.

Figure 9C:
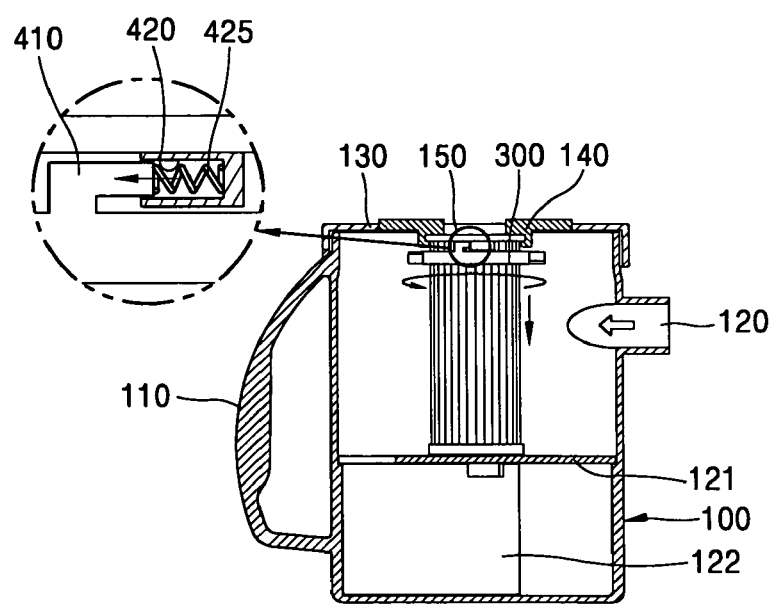

Thereafter, when an operation stopping mode is selected, as shown in FIG. 9C, the pressure of air is removed and the elastic member 425 of the second stopper 420 is restored to its original state. At this time, by this restoration, the filter cleaning unit 200 is sprung instantly and rotated in a direction opposite to the direction that air rotates, whereby the first stopper 410 is separated from the second stopper 420, and accordingly, the filter cleaning unit 200 descends to its initial position.

In such a manner, the filter cleaning unit rotates and ascends by a rotation force of air sucked into an internal space of the casing to thereby clean the outer circumferential surface of the filter. For this reason, flow resistance of air, which may occur when the outer circumferential surface of the filter is closed up with dust can be reduced even if the cleaner is operated for a long time. Accordingly, efficiency of the cleaner can be remarkably improved.

In addition, when the rotary ring cleans the outer circumferential surface of the filter, rotation and ascent of the rotary ring can be properly restrained by using the first stopper and the second stopper. Accordingly, since the filter is prevented from being damaged when the brush of the filter cleaning unit is excessively brushes the filter to clean it, big dust or foreign substances are not discharged together with fine dust, and also a life span of the filter can be greatly extended.

Figure 10:
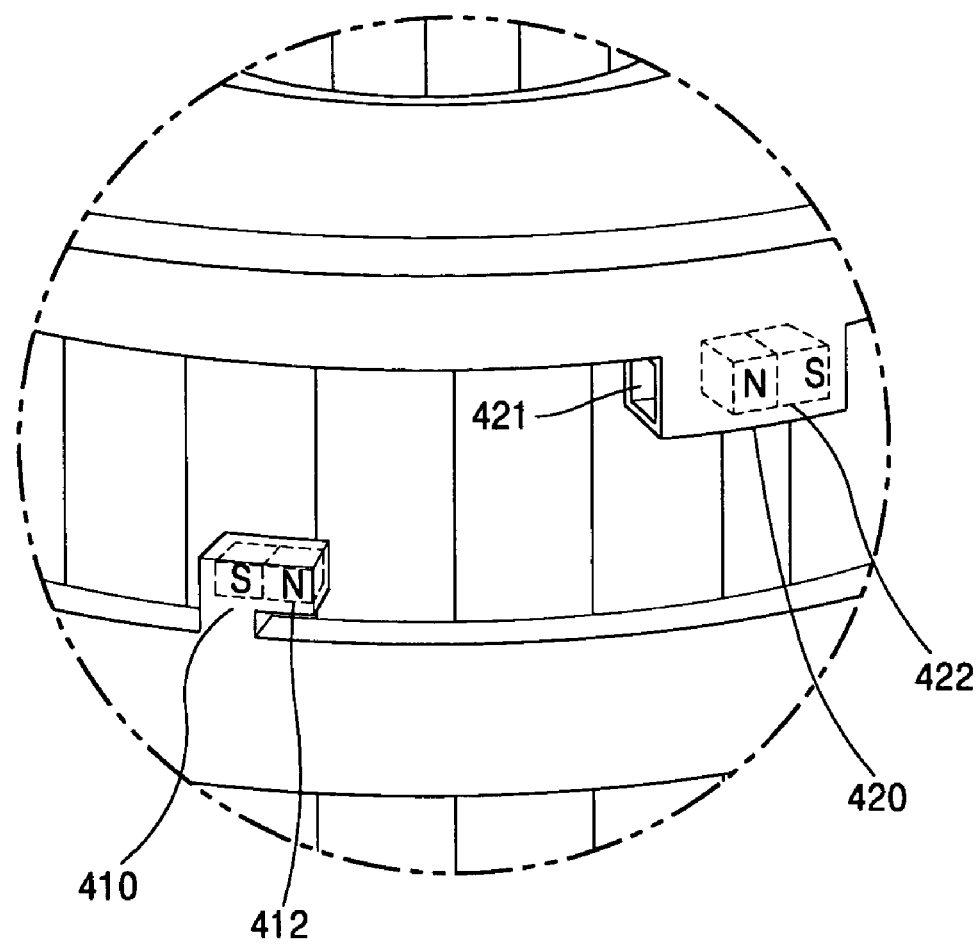
FIG. 10 is a perspective view showing a cleaning control part in accordance with a second embodiment of the present invention.

FIG. 10 is a perspective view showing a cleaning control part in accordance with a second embodiment of the present invention. The same structure and operation as the first embodiment will be omitted.

As shown therein, the rotation control means 400 includes a first stopper 410 protruded from an upper surface of the rotary ring 210; and a second stopper 420 formed at the filter supporter 140 connected to the filter 300, by which the first stopper 410 is caught.

The first stopper 410 is protruded in a direction that the rotary ring 210 is rotated and includes a magnetic body 412.

The second stopper 420 is protruded from a lower side of the filter supporter 140 and includes an insertion groove 421 in which the first stopper 410 is inserted and a magnetic body 422 inserted in the insertion groove 421. Here, a portion of the magnetic body 422 of the second stopper 420 and a portion of the magnetic body 412 of the first stopper 410, which face each other, have the same polarity so that when the cleaner is in operation, the first stopper 410 and the second stopper 420 meet each other by movement of a fluid, and if the cleaner is stopped, the first stopper 410 is distanced from the second stopper 420 by a magnetic force.

Preferably, the magnetic body 412, 422 is a permanent magnet.

An operation of a filter device for a vacuum cleaner in accordance with the present invention will now be described.

The filter cleaning unit 200 ascends to an upper end of the filter 300 by a rotation force and an ascending force of air sucked into the casing 100 to thereby brush and clean an outer circumferential surface of the filter 300. The first stopper 410 provided at an upper end of the filter cleaning unit 200 is inserted into the second stopper 420 provided at an upper end of the filter 300 so as to restrain further rotation. Accordingly, like the first embodiment, by preventing further rotation, the brush of the filter cleaning unit 200 is prevented from excessively cleaning the filter 300.

Here, since a portion of the permanent magnet 412 mounted at the first stopper 410 and a portion of the permanent magnet 422 mounted at the second stopper 420, which have the same polarity, face each other, a repulsive force is maintained.

When pressure of air is removed, the filter cleaning unit 200 is sprung instantly in a direction opposite to a direction that air rotates and is rotated by a repulsive force between the permanent magnet 412 mounted at the first stopper 410 and the permanent magnet 422 mounted at the second stopper 420, so that the first stopper 410 is separated from the second stopper 420 and descends to its initial position.

A filter cleaning unit in accordance with a third embodiment of the present invention will now be described.

Figure 11:
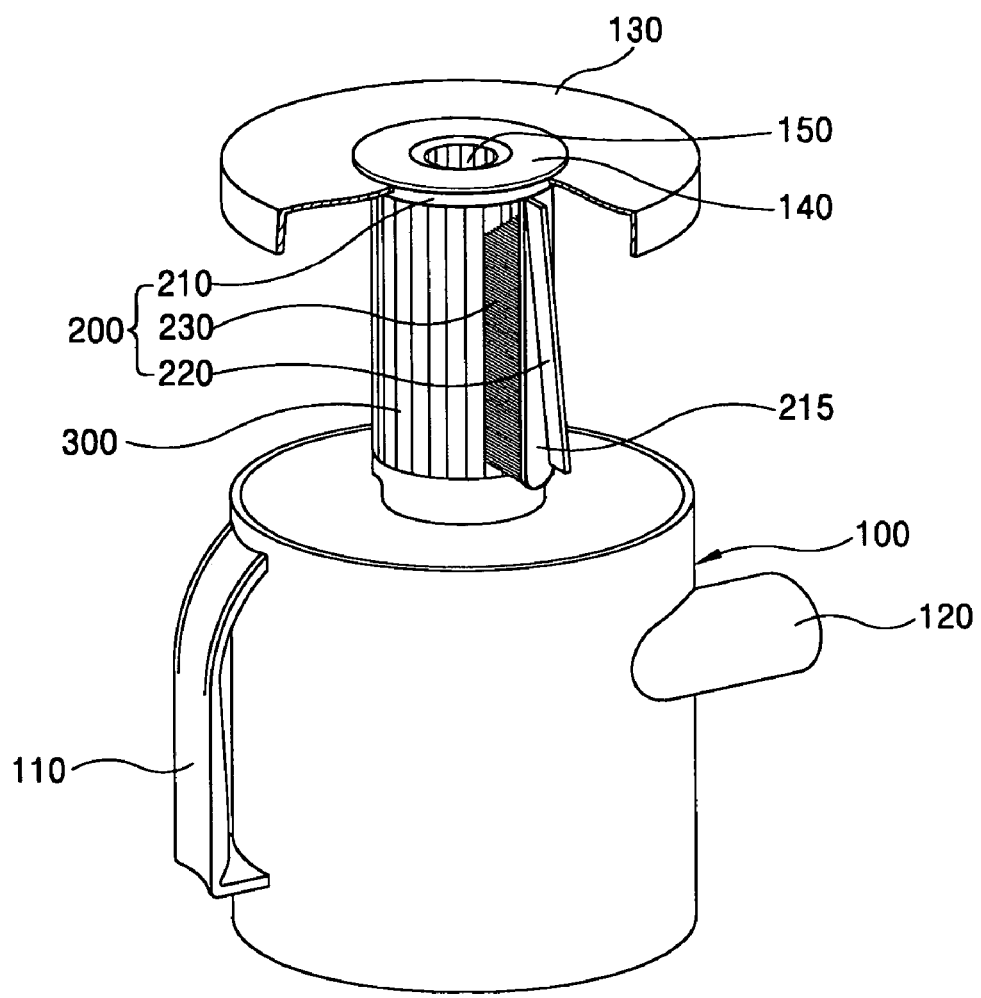
FIG. 11 is a longitudinal sectional view of a filter device for a vacuum cleaner in accordance with a third embodiment of the present invention.
Figure 12:
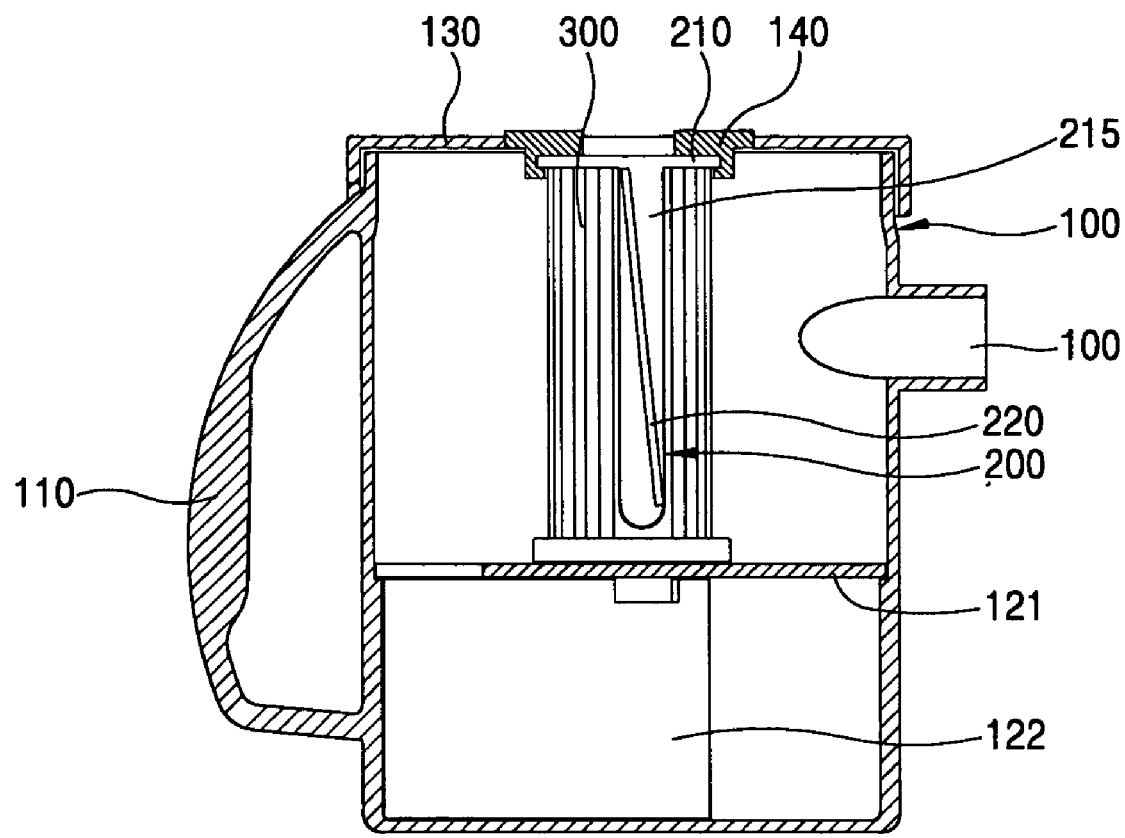
FIG. 12 is a partially cut-out perspective view of a filter device of a vacuum cleaner in accordance with a third embodiment of the present invention.

FIG. 11 is a longitudinal sectional view of a filter device for a vacuum cleaner in accordance with a third embodiment of the present invention, and FIG. 12 is a partially cut-out perspective view of a filter device for a vacuum cleaner in accordance with a third embodiment of the present invention.

The filter cleaning unit 200 in accordance with the present invention includes a rotary ring disposed at an outer circumferential surface of the filter 300; a brush supporter 215 connected to the rotary ring 210 and formed in an axial direction of the filter 300 almost as high as a height of the filter 300; a blade 220 formed at an outer surface of the brush supporter 215, for rotating the rotary ring by movement of air sucked through the suction opening 120; and a brush 230 mounted inside the brush supporter 215, for removing dust attached to the surface of the filter 300 by being rotated together with the rotary ring 210.

An operation of the filter device for a vacuum cleaner in accordance with the present invention will now be described.

Like the conventional art, fine dust or foreign substances in air sucked through the suction opening 120 are purified again by the filter 300.

Here, the air rotating along a wall surface of the casing 100 collides against the blade 220 of the filter-cleaning unit 200 located at the outer circumferential surface of the filter 300, thereby inducing a rotation force. By the rotation force of the air, the filter cleaning unit 200 is rotated in a direction that air rotates so that the brush 230 brushes the outer circumferential surface of the filter 300 and continuously remove fine dust or filth from the filter 300.

In such a manner, the filter cleaning unit 200 is rotated by a rotation force of air sucked into a certain space of the casing 100 to clean the outer circumferential surface of the filter 300. Therefore, even if the cleaner is operated for a long time, flow resistance of air, which may occur when dust is attached to the outer circumferential surface of the filter, is reduced to thereby remarkably improve efficiency of a cleaner.

In addition, the outer circumferential surface of the filter is cleaned while a dust removing means rotates and ascends by a rotation force of air sucked into an internal space of the casing. Accordingly, even if the cleaner is operated for a long time, flow resistance of air, which may occur when dust is attached to the outer circumferential surface of the filter, is reduced to thereby remarkably increase efficiency of the cleaner.

In addition, when the outer circumferential surface of the filter is cleaned by a rotary ring, rotation and ascent of the rotary ring can be properly restrained by using a stopping projection and a stopping groove, so that the filter can be prevented from being damaged since a brush of the dust removing means brushes the filter excessively to clean it. Accordingly, not only can it prevent big dust or foreign substances from being discharged together with fine dust but a life span of the filter can be greatly lengthened.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A filter device for a vacuum cleaner comprising:
   a casing having a collecting space therein, a suction opening for sucking air including dust being formed eccentrically at one side of the collecting space so that sucked air can be rotated, and a discharge opening through which purified air is discharged;
   a filter provided internally of the casing, for filtering dust from air sucked through the suction opening;
   a filter cleaning unit disposed at an outer circumferential surface of the filter, for cleaning the filter, the filter cleaning unit being rotated and lifted by movement of air sucked through the suction opening; and
   a rotation restrainer for restraining rotation of the filter cleaning unit when the filter cleaning unit reaches a topmost point.

2. The filter device of claim 1, wherein the filter cleaning unit comprises:
   a rotary ring disposed at an outer circumferential surface of the filter;
   a blade mounted at an outer surface of the rotary ring, for rotating and lifting the rotary ring by movement of air sucked through the suction opening; and
   at least one brush mounted inside the rotary ring, for removing dust attached to the surface of the filter by being rotated together with the rotary ring.

3. The filter device of claim 2, wherein the rotary ring comprises a lightweight material, wherein the rotary ring is rotated and lifted easily.

4. The filter device of claim 2, wherein the blade is inclined with respect to an axial direction of the filter so as to generate a rotation force and an lifting force.

5. The filter device of claim 1, wherein the rotation restrainer comprises:
   a first stopper protruding from an upper surface of the rotary ring; and
   a second stopper provided at a filter supporter connected to the filter so that the first stopper is caught thereby.

6. The filter device of claim 5, wherein the first stopper protrudes in a direction that the rotary ring is rotated, and the second stopper protrudes from a lower side of the filter supporter and includes an insertion groove in which the first stopper is received and an elastic member in the insertion groove, for releasing the first stopper from the insertion groove when the vacuum cleaner is stopped.

7. The filter device of claim 6, wherein the elastic member is a coil spring.

8. The filter device of claim 5, wherein the first stopper includes a magnetic body, and the second stopper protrudes from a lower side of the filter supporter includes an insertion groove in which the first stopper is received and a magnetic body in the insertion groove, wherein a portion of the magnetic body of the first stopper and a portion of the magnetic body of the second stopper, which face each other, have the same polarity so that when the cleaner is in operation, the first stopper and the second stopper meet each other by movement of a fluid, and when the cleaner is stopped, the first stopper is separated from the second stopper by a magnetic force.

9. The filter device of claim 8, wherein the magnetic body is a permanent magnet.

10. The filter device of claim 1, wherein the filter cleaning unit comprises:
    a rotary ring disposed at an outer circumferential surface of the filter;
    a brush supporter connected to the rotary ring and extending in an axial direction of the filter almost as high as a height of the filter;
    a blade formed at an outer surface of the brush supporter, for rotating the rotary ring by movement of the air; and
    a brush mounted inside the brush supporter, for removing dust attached to the surface of the filter by being rotated together with the rotary ring.

* * * * *